United States Patent
Lopez et al.

(10) Patent No.: US 8,991,313 B2
(45) Date of Patent: Mar. 31, 2015

(54) REDUCING PRINT QUALITY DEFECTS

(71) Applicant: Hewlett-Packard Development Company, L.P., Houston, TX (US)

(72) Inventors: Matthew G. Lopez, Escondido, CA (US); Roya S. Akhavain, San Diego, CA (US); James M. Pingel, San Diego, CA (US); David F. Chiu, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 13 days.

(21) Appl. No.: 13/741,861

(22) Filed: Jan. 15, 2013

(65) Prior Publication Data

US 2014/0196623 A1 Jul. 17, 2014

(51) Int. Cl.
- B41F 23/04 (2006.01)
- B41J 19/14 (2006.01)
- B41F 31/02 (2006.01)
- H04N 19/00 (2014.01)

(52) U.S. Cl.
CPC ............... *B41J 19/147* (2013.01); *B41F 31/02* (2013.01); *H04N 19/00* (2013.01)
USPC .......................... 101/416.1; 101/423; 101/425

(58) Field of Classification Search
USPC ......... 101/348, 352.09, 416.1, 161, 153, 423, 101/425; 399/74, 57, 233, 237, 357, 345
See application file for complete search history.

(56) References Cited

U.S. PATENT DOCUMENTS

| | | | |
|---|---|---|---|
| 4,592,278 A | 6/1986 | Tokuno et al. | |
| 5,610,694 A * | 3/1997 | Lior et al. | 399/240 |
| 6,234,602 B1 | 5/2001 | Soto et al. | |
| 6,345,876 B1 | 2/2002 | Tanaka et al. | |
| 6,454,383 B2 | 9/2002 | Lund et al. | |
| 6,615,004 B1 * | 9/2003 | Gila et al. | 399/57 |
| 6,832,066 B2 | 12/2004 | Watanabe et al. | |
| 7,025,433 B2 | 4/2006 | Lopez et al. | |
| 7,319,826 B2 | 1/2008 | Shim | |
| 7,755,799 B2 | 7/2010 | Paul et al. | |
| 2005/0095024 A1 * | 5/2005 | Gross et al. | 399/55 |
| 2007/0003303 A1 * | 1/2007 | Burry et al. | 399/53 |
| 2011/0026994 A1 | 2/2011 | Ryu | |
| 2011/0249989 A1 * | 10/2011 | Levintant et al. | 399/237 |

OTHER PUBLICATIONS

Anthony, et al., "ElectroInk Charge Retention in the HP Indigo LEP Press," HP Laboratories, Retrieved from http://www.hpl.hp.com/techreports/2012/HPL-2012-30.pdf, Feb. 21, 2012, 2 pages.

* cited by examiner

*Primary Examiner* — Matthew G Marini

(57) ABSTRACT

Reducing print quality defects can include printing a pattern with an offset printing device having a binary ink developer roller, determining a variation for a hue shift of the printed pattern; and varying gain in a feedback loop of a servo motor coupled to the binary ink developer roller to reduce the variation.

15 Claims, 3 Drawing Sheets

REDUCING PRINT QUALITY DEFECTS

BACKGROUND

Various printing devices are employed for a variety of applications. An offset printing device includes an intermediate cylinder that transfers an ink image from its origin, e.g., on a plate cylinder, to a material on which the image is to be printed.

Compared to some other printing devices, offset printing devices can help to protect the surface of the printing plate from wear due to friction with the substrate during printing. Also, offset printing devices can help to provide a more even pressure, e.g., from the intermediate cylinder to the substrate, than some other printing devices. Because of the more even pressure associated with offset printing devices, offset printing devices can be utilized to print on a greater variety of substrates, e.g., differing surfaces and/or thicknesses, than some other printing devices.

DETAILED DESCRIPTION

Figure 1:
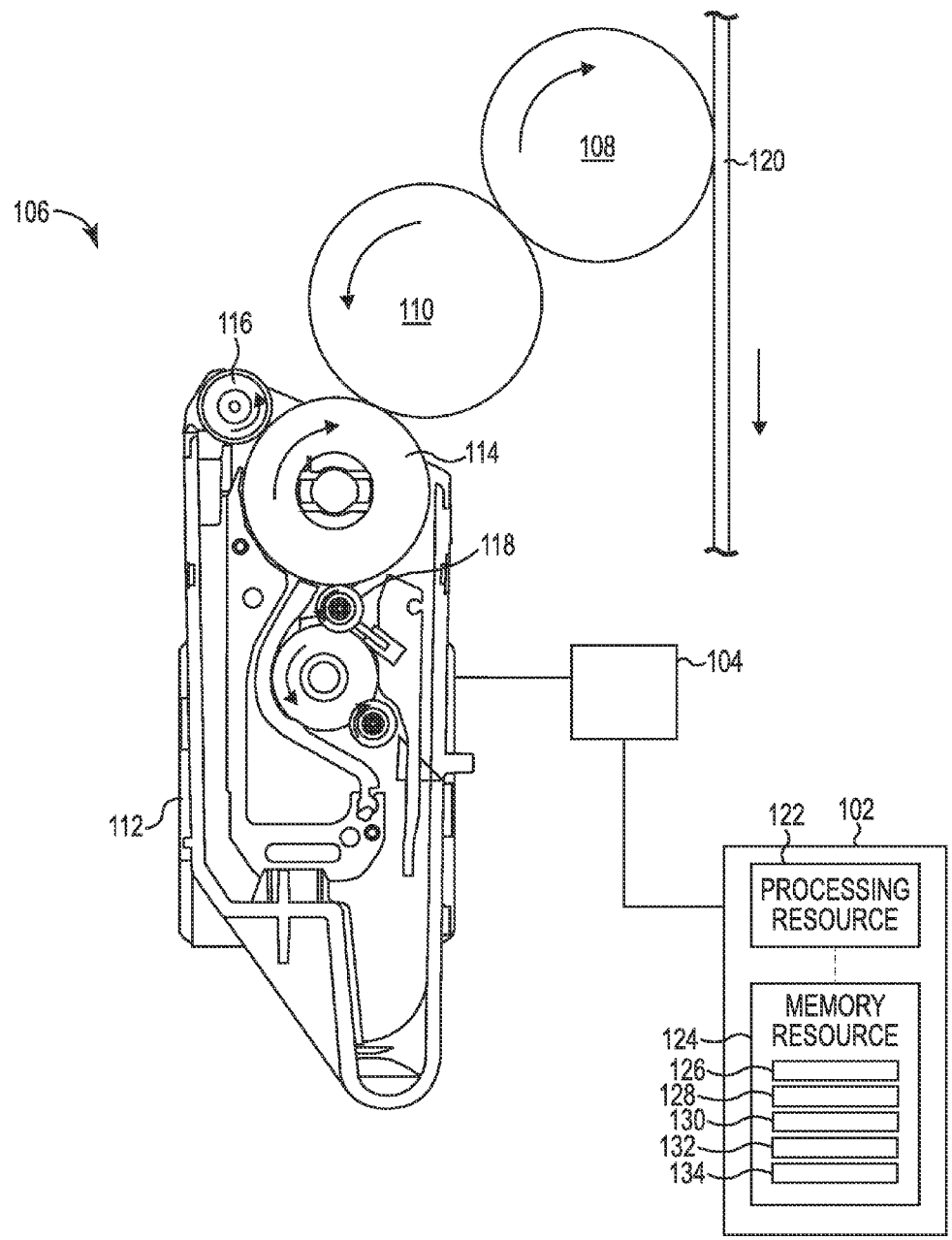
FIG. 1 illustrates a system for reducing print quality defects according to the present disclosure.

Offset printing devices, such as liquid electrophotography printing devices, can be utilized to produce images. Offset printing devices, which are described further herein, can include a number of components including a binary ink developer roller and a cleaning roller. The cleaning roller can remove excess ink from the binary ink developer roller. However, under some conditions the binary ink developer roller and the cleaning roller can separate from one another. When the rollers separate, ink, which was to be removed by the cleaning roller, remains on the binary ink developer roller. The ink that was not removed from the binary ink developer roller when the rollers separated can be transferred to a substrate and result in a print quality defect. Advantageously, examples of the present disclosure can reduce print quality defects, e.g., by reducing separation of the binary ink developer roller and the cleaning roller. Embodiments of the present disclosure provide that separation of the binary ink developer roller and the cleaning roller can be reduced by varying gain in a feedback loop of a servo motor coupled to the binary ink developer roller and/or varying a variable of integration in the feedback loop of the servo motor coupled to the binary ink developer roller.

Systems, methods, and machine-readable and executable instructions are provided for reducing print quality defects. Reducing print quality defects can include printing a pattern with an offset printing device having a binary ink developer roller, determining a standard deviation for a hue shift of the pattern; and varying gain in a feedback loop of a servo motor coupled to the binary ink developer roller to reduce the standard deviation.

In the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure. The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 illustrates a system 102 for reducing print quality defects according to the present disclosure. The system 102 can utilize software, hardware, firmware, and/or logic to perform a number of functions, e.g., print a pattern with an offset printing device having a binary ink developer roller, determine a standard deviation for a hue shift of the pattern; and vary gain in a feedback loop of a servo motor coupled to the binary ink developer roller to reduce the standard deviation, etc.

As illustrated in FIG. 1, the system 102 can be coupled to a servo motor 104. The servo motor 104 can be a direct current motor or an alternating current motor. The servo motor 104 can be coupled to a position sensing device, such as a digital decoder, for example.

A portion of an offset printing device 106 is also illustrated in FIG. 1. As illustrated in FIG. 1, the offset printing device 106 can include an intermediate cylinder 108, a plate cylinder 110, and a binary developer 112, among other components. While a portion the offset printing device 106 is described herein, the offset printing device 106 and/or the operation thereof may include additional components and/or operation procedures.

Examples of the present disclosure provide that the offset printing device 106 can be a liquid electrophotography printing device. Examples of the present disclosure provide that the offset printing device 106 can be a digital offset printing device. For example, the plate cylinder 110 can include a photo imaging plate. The photo imaging plate can be charged as it rotates, for example, such that the photo imaging plate is covered with a uniform electric charge. The charged photo imaging plate can pass by an imaging unit. The imaging unit can include a number of lasers that can dissipate charge on portions of the charged photo imaging plate corresponding to an image.

The binary developer 112 can include a binary ink developer roller 114. The binary ink developer roller 114 can apply ink to the charged photo imaging plate. The binary ink developer roller 114 and the plate cylinder 110 can carry different voltages, such that electrostatic forces are created between the two rotating cylinders. The electrostatic forces can attract the ink particles, e.g., charged ink particles, to the dissipated charge areas of the photo imaging plate, while repelling the ink particles from the areas of the photo imaging plate that remain charged. The binary ink developer roller 114 can be coupled to the servo motor 104, e.g., gear driven by a cleaning roller 118, discussed further herein.

While FIG. 1 illustrates a single binary developer 112, the offset printing device 106 can include a plurality of binary developers. For instance, the offset printing device 106 can include 2, 3, 4, 5, 6, 7, or more binary developers. Each binary developer can be associated with a particular ink utilized by the offset printing device 106. Examples of ink include cyan ink, magenta ink, yellow ink, black ink, orange ink, violet ink, spot color inks, such as those in the PANTONE® color range, opaque white ink, and fluorescent ink, among others. The ink can be a liquid ink. The ink can include electrically charged particles, such as HP ElectroInk, commercially available from Hewlett-Packard.

The binary developer 112 can include a squeegee roller 116. The squeegee roller 116 can help to maintain a consistent layer of ink on the binary ink developer roller 114 prior to the ink being transferred to the plate cylinder 110. The squeegee roller 116 can be biased, e.g., spring loaded, towards the binary ink developer roller 114. The squeegee roller 116 can be gear driven, e.g., by the binary ink developer roller 114.

The binary developer 112 can include a cleaning roller 118. As mentioned, the cleaning roller 118 can remove excess ink from the binary ink developer roller 114. However, under some conditions, as discussed further herein, the binary ink developer roller 114 and the cleaning roller 118 can separate from one another and result in a print quality defect when ink, which was to be removed by the cleaning roller 118, remains on the binary ink developer roller 114 due to the separation. The cleaning roller 118 can be biased, e.g., spring loaded, towards the binary ink developer roller 114. The cleaning roller 118 can be directly driven, e.g. by servo motor 104.

Ink that has been transferred to plate cylinder 110 can next be transferred, e.g., electrically, to the intermediate cylinder 108. The intermediate cylinder 108 can include a covering, e.g., a blanket. The covering can be a material, such as rubber, among others, that helps allow the covering to conform to local topography of the substrate. The intermediate cylinder 108 and/or the covering may be operated at a temperature of approximately 100° C.

From the intermediate cylinder 108 ink can be transferred to a substrate 120, thus producing an image. Examples of the substrate 120 include paper, card stock, plastic, film, and metals, among others.

The system 102 can be a combination of hardware and program instructions configured to perform functions. The hardware, for example, can include a processing resource 122. Processing resource 122 may represent a number of processors capable of executing instructions stored by a memory resource, e.g., memory resource 124, machine readable medium, etc. Processing resource 122 may be integrated in a single device or distributed across devices. The hardware, for example, can alternatively or additionally include a memory resource 124. Memory resource 124 can represent generally a number of memory components capable of storing program instructions, e.g., machine-readable instructions, etc., that can be executed by processing resource 122. Memory resource 124 can include non-transitory computer readable media. Memory resource 124 may be integrated in a single device, e.g., offset printing device 106, or distributed across devices. Further, memory resource 124 may be fully or partially integrated in the same device as processing resource 122 or it may be separate but accessible to that device and processing resource 122.

The program instructions, e.g., machine-readable instructions (MRI), can include a number of modules, e.g., 126, 128, 130, 132, and 134, that include machine-readable instructions executable by the processing resource 122 to execute an intended function, e.g., print a pattern with an offset printing device having a plurality of binary ink developer rollers, determine a standard deviation for a hue shift of the pattern, determine a standard deviation for a density shift of the pattern, vary gain in a feedback loop of a servo motor coupled to a first of the plurality of binary ink developer rollers to reduce the standard deviation for the hue shift, vary gain in a feedback loop of a servo motor coupled to a second of the plurality of binary ink developer rollers to reduce the standard devia-tion for the density shift, etc. Each module, e.g., 126, 128, 130, 132, and 134, can be a sub-module of another module.

A printing module 126 can include MRI that when executed by the processing resource 122 can, for example, print a pattern with an offset printing device, e.g., offset printing device 106, having a plurality of binary ink developer rollers. Examples of the present disclosure provide that the pattern can be a stair-step pattern, among other patterns. A stair-step pattern can include an "A color", e.g., cyan, and a "B color", e.g., black. For example, a number of horizontal lines, e.g., 3, 5, 7, 9, 11, or another number, of the B color can be printed horizontally across a substrate. The number of horizontal lines can have a width of 3 pixels or 5 pixels, among other widths; can have a length of 6720 pixels, among other lengths; and can be separated from another horizontal line by a distance of 20 pixels, among other distances. Upon each of the horizontal lines of the B color, an A color can be printed. The A color can be directly printed upon the B color at the longitudinal center of a respective horizontal B color line, and incremented sequentially by 1 pixel from the longitudinal center, e.g. to form a line having a portion on a first side of the horizontal B color line and a portion on a second side of the horizontal B color line.

A hue shift standard deviation module 128 can include MRI that when executed by the processing resource 122 can, for example, determine a standard deviation for a hue shift of the pattern. For example, an average hue can be determined for a pixel block, e.g., a 97 pixel block, among other pixel blocks of the pattern. Therefrom, the standard deviation for a hue shift of the pattern can be determined statistically.

A density shift standard deviation module 130 can include MRI that when executed by the processing resource 122 can, for example, determine a standard deviation for a density shift of the pattern. When determining the density shift, the A color is the same color as the B color, e.g., black. For example, an average density can be determined for a pixel block, e.g., a 97 pixel block, among other pixel blocks of the pattern. Therefrom, the standard deviation for a density shift of the pattern can be determined statistically.

A vary gain module 132, e.g., a first vary gain module, can include MRI that when executed by the processing resource 122 can, for example, vary gain, as discussed further herein, in a feedback loop of a servo motor coupled to a first of the plurality of binary ink developer rollers to reduce the standard deviation for the hue shift.

A vary gain module 134, e.g., a second vary gain module, can include MRI that when executed by the processing resource 122 can, for example, vary gain, as discussed further herein, in a feedback loop of a servo motor coupled to a second of the plurality of binary ink developer rollers to reduce the standard deviation for the density shift.

The memory resource 124, as described herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), etc., as well as other types of machine-readable media.

The memory resource 124 can be integral and/or communicatively coupled to a computing element, e.g. of offset printing device 106, in a wired and/or a wireless manner. For example, the memory resource 124 can be an internal memory, a portable memory, a portable disk, and/or a memory associated with another computing resource, e.g., enabling MRIs to be transferred and/or executed across a network such as the Internet.

As used herein, "logic" is an alternative and/or additional processing resource to execute the actions and/or functions, etc., described herein, which includes hardware, e.g., various forms of transistor logic, application specific integrated circuits (ASICs), etc., as opposed to computer executable instructions, e.g., software, firmware, etc., stored in memory and executable by a processor.

The offset printing device 106 can include a scanner (not shown in FIG. 1), such as an in-line scanner, for example. The scanner can scan a pattern that has been printed with the offset printing device 106. Examples of the present disclosure provide that variation for a hue shift of the pattern and/or variation for a density shift of the pattern can be determined via the scanned printed pattern. For instance, the offset printing device 106 can determine variation for a hue shift of the pattern and/or variation for a density shift of the pattern by analyzing the scanned printed pattern.

Figure 2:
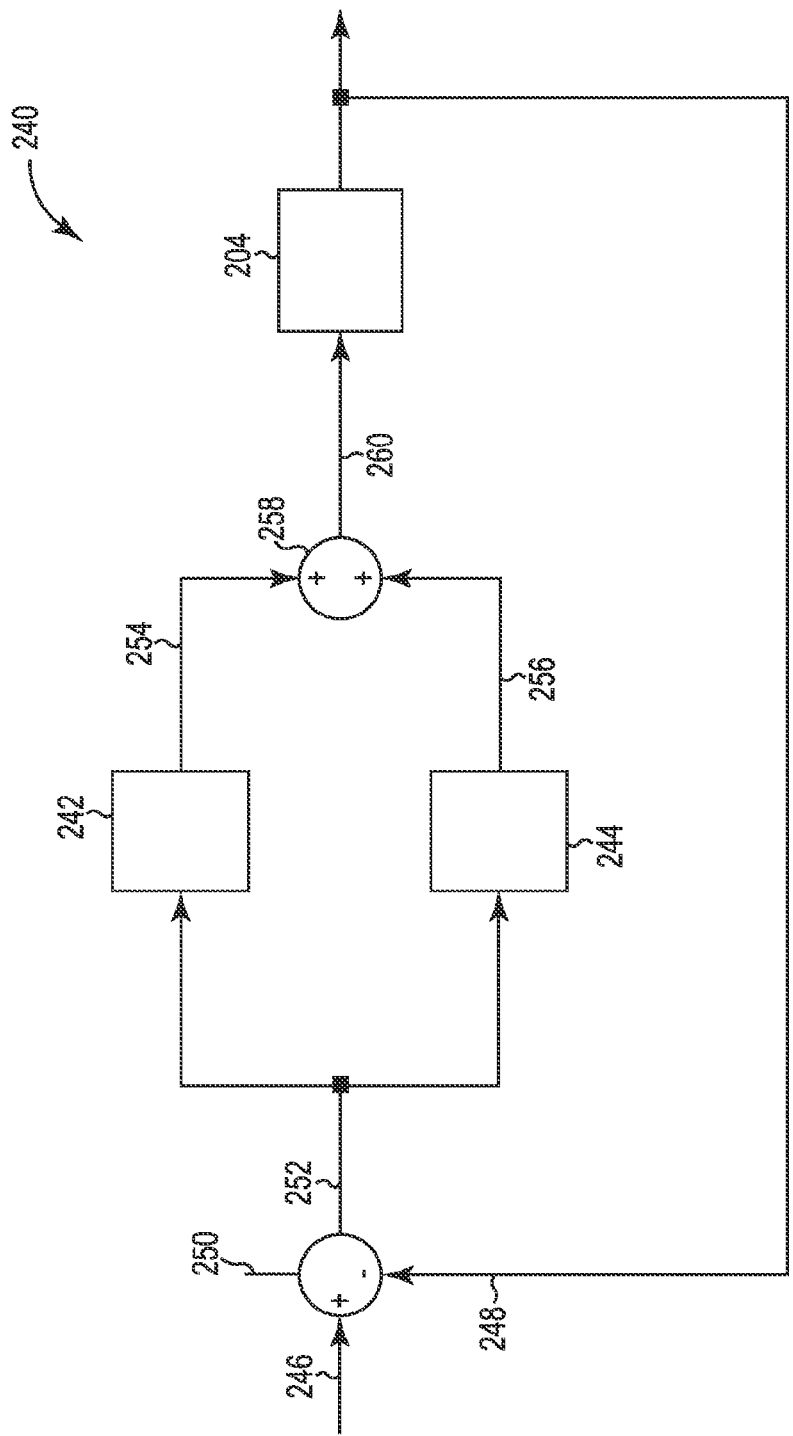
FIG. 2 illustrates a block diagram of a feed back loop of a servo motor according to the present disclosure.

FIG. 2 illustrates a block diagram of a feedback loop 240 of a servo motor according to the present disclosure. Examples of the present disclosure provide that the feedback loop 240 is a proportional-integral (PI) feedback loop. For example, the feedback loop 240 can include a proportional parameter 242 and an integral parameter 244.

For the feedback loop 240, an input reference signal 246 can be compared with feedback signal 248 at a summing point 250. At the summing point 250, a difference between the input reference signal 246 and the feedback signal 248 can be determined to obtain a deviation 252, for example. The deviation 252 may be referred to as error.

The deviation 252 can be inputted into the proportional parameter 242. The proportional parameter 242 can generate a proportional output signal 254. The proportional output signal 254 can be an output value that is proportional to the current error value. The proportional output signal 254 can be adjusted by multiplying the error by a constant $K_p$, which can be referred to as proportional gain, discussed further herein.

The deviation 252 can be inputted into the integral parameter 244. The integral parameter 244 can generate an integral output signal 256. The integral output signal 256 can be proportional to both the magnitude of the error and the duration of the error. The integral output signal 256 can be considered the sum of the instantaneous error over time and can provide the accumulated offset that should have been corrected previously. The integral output signal 256 can be adjusted by multiplying accumulated error by a constant $K_i$, which can be referred to as integral gain, discussed further herein.

The proportional output signal 254 and the integral output signal 256 can be summed at an output summing point 258 to provide a summed output 260, which may be referred to as a manipulated variable. The summed output 260 can be inputted to the servo motor 204 to dynamically control the servo motor 204.

Examples of the present disclosure provide that the summed output 260 can be represented by the following formula:

$$MV(t) = K_p e(t) + K_i \int_0^t e(\tau) d\tau$$

where MV(t) is the summed output 260, $K_p$ is a proportional gain constant, e.g., gain of the proportional parameter 242, $K_i$ is gain of the integral parameter 244, e is the deviation 252, t is time, which may be referred to as instantaneous time or the present time, and $\tau$ is a variable of integration having values from time zero to the time t. Examples of the present disclosure provide that $K_p$, $K_i$, and $\tau$ are each independently variable.

As mentioned, under some conditions the binary ink developer roller and the cleaning roller can separate from one another and result in remaining ink, which was to be removed by the cleaning roller, that can produce a print quality defect. Further as mentioned, examples of the present disclosure can reduce print quality defects by varying gain in the feedback loop of the servo motor coupled to the binary ink developer roller to reduce the standard deviation for the hue shift and/or the density shift. Examples of the present disclosure provide that $K_p$, the gain of the proportional parameter, and/or $K_i$, the gain of the integral parameter can be varied. For instance, $K_p$ and/or $K_i$ can be reduced from default gain values to reduce the standard deviation for the hue shift and/or the density shift. As an example, the default gain values can be maximum gain vales. Examples of the present disclosure provide that proportional gain, e.g., $K_p$, can be reduced by a value in a range from 0.1 percent to 65 percent, as compared to a previous value, e.g. a default gain value, of the proportional gain. Examples of the present disclosure provide that integral gain, e.g., $K_i$, can be reduced by a value in a range from 0.1 percent to 65 percent, as compared to a previous value, e.g. a default gain value, of the integral gain. Also, for instance, $K_p$ and/or $K_i$ can be increased from particular gain values to reduce the standard deviation for the hue shift and/or the density shift. Examples of the present disclosure provide that proportional gain, e.g., $K_p$, can be increased by a value in a range from 0.1 percent to 65 percent, as compared to a previous value, e.g. a default gain value, of the proportional gain. Examples of the present disclosure provide that integral gain, e.g., $K_i$, can be increased by a value in a range from 0.1 percent to 65 percent, as compared to a previous value, e.g. a default gain value, of the integral gain. Varying the varying gain, e.g., $K_p$ and/or $K_i$, in the feedback loop of the servo motor coupled to the binary ink developer roller can reduce the standard deviation for the hue shift and/or the density shift by helping to reduce separation of the binary ink developer roller and the cleaning roller.

Figure 3:
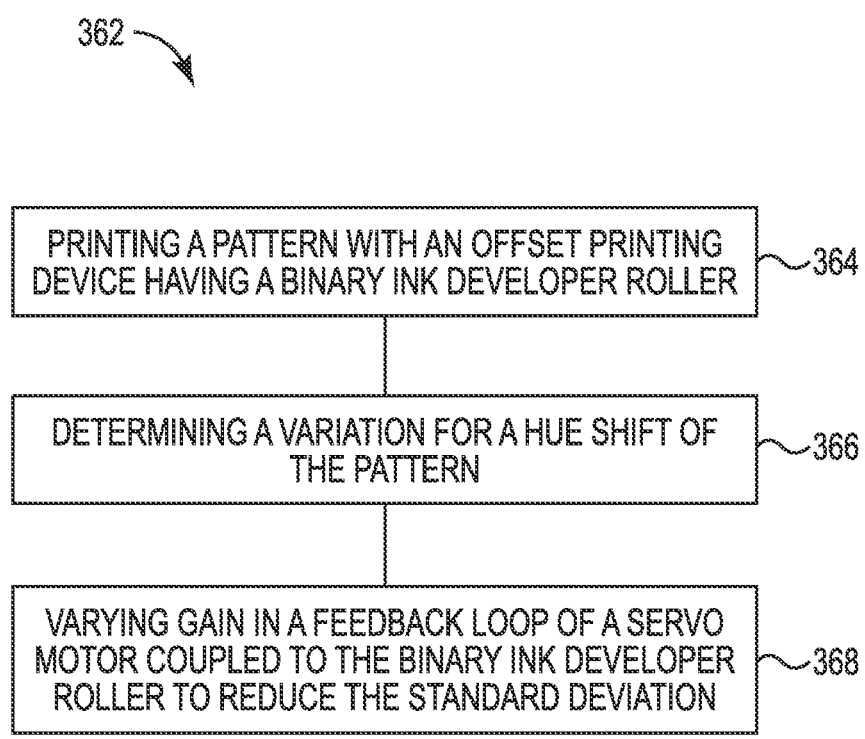
FIG. 3 illustrates a block diagram of an example of a method for reducing print quality defects according to the present disclosure.

Additionally, examples of the present disclosure provide that the variable of integration $\tau$ can be varied in a feedback loop of a servo motor coupled to a binary ink developer roller to reduce the standard deviation for the hue shift and/or the density shift, as discussed herein. For instance in a number of applications, the variable of integration can be reduced to reduce the standard deviation for the hue shift and/or the density shift. Examples of the present disclosure provide that the variable of integration, e.g., $\tau$, can be reduced by a value in a range from 0.1 percent to 65 percent, as compared to a previous value, e.g. a default value, of the variable of integration. Also, for instance in other applications, the variable of integration can be increased to reduce the standard deviation for the hue shift and/or the density shift. Examples of the present disclosure provide that the variable of integration, e.g., $\tau$, can be increased by a value in a range from 0.1 percent to 65 percent, as compared to a previous value, e.g. a default value, of the variable of integration FIG. 3 illustrates a block diagram of an example of a method 362 for reducing print quality defects according to the present disclosure. Print quality defects can be reduced by varying gain and/or by varying a variable of integration to reduce the standard deviation for the hue shift and/or the density shift, as discussed herein. Examples of the present disclosure provide that varying gain and/or by varying a variable of integration to reduce the standard deviation for the hue shift and/or the density shift can be performed following installation of a binary ink developer, e.g. after a new binary ink developer has replaced an old binary ink developer.

At 364, the method 362 can include printing a pattern with an offset printing device having a binary ink developer roller. As mentioned, the pattern can be a stair-step pattern, among other patterns. The pattern can include a printing for each binary ink developer roller of the offset printing device. Additionally, examples of the present disclosure provide that the pattern can include a plurality of printings for each binary ink developer roller of the offset printing device.

At 366, the method 362 can include determining a variation for a hue shift of the pattern. For example, hue shift for one or more of the plurality of printings for a particular binary ink developer roller can be determined statistically. In various examples, determining the variation for the hue shift can include determining a standard variation for the hue shift of the pattern.

At 368, the method 362 can include varying gain in a feedback loop of a servo motor coupled to the binary ink developer roller to reduce the standard deviation. For instance, gain in a feedback loop of a servo motor coupled to the binary ink developer roller can be reduced to reduce separation of the binary ink developer roller and the cleaning roller, which results in a reduced standard deviation for the hue shift corresponding to a reduction of print quality defects. Also, for some applications, gain in a feedback loop of a servo motor coupled to the binary ink developer roller can be increased to reduce separation of the binary ink developer roller and the cleaning roller, which results in a reduced standard deviation for the hue shift corresponding to a reduction of print quality defects.

In various examples, the method can include determining a variation for a density shift of the pattern. For example, density shift for one or more of the plurality of printings for a particular binary ink developer roller can be determined statistically. In various examples, determining the variation for the density shift can include determining a standard variation for the density shift of the pattern.

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A method for reducing print quality defects comprising:
   printing a pattern with an offset printing device having a binary ink developer roller and a cleaning roller;
   determining a variation for a hue shift of the printed pattern; and
   varying gain in a feedback loop of a servo motor coupled to the binary ink developer roller to reduce the variation by reducing separation between the binary ink developer roller and the cleaning roller.

2. The method of claim 1, wherein varying gain in the feedback loop of the servo motor includes reducing gain in the feedback loop of the servo motor.

3. The method of claim 1, wherein varying gain in the feedback loop of the servo motor includes increasing gain in the feedback loop of the servo motor.

4. The method of claim 1, wherein determining the variation for the hue shift includes determining a standard variation for the hue shift of the printed pattern.

5. The method of claim 1, including determining a variation for a density shift of the printed pattern.

6. The method of claim 5, wherein determining the variation for the density shift includes determining a standard deviation for a density shift of the printed pattern.

7. A non-transitory computer-readable medium storing a set of instructions executable by a processor to cause a computer to
   print a pattern with an offset printing device having a binary ink developer roller and a cleaning roller;
   determine a standard deviation for a density shift of the printed pattern; and
   vary gain in a feedback loop of a servo motor coupled to the binary ink developer roller to reduce the standard deviation by reducing separation between the binary ink developer roller and the cleaning roller.

8. The medium of claim 7, wherein the instructions executable by a processor include instructions to scan the printed pattern with the offset printing device.

9. The medium of claim 7, wherein the standard deviation for a density shift is associated with black ink.

10. The medium of claim 7, wherein the instructions executable by the processor include instructions to vary proportional gain in the feedback loop of the servo motor coupled to the binary ink developer roller to reduce the standard deviation.

11. The medium of claim 7, wherein the instructions executable by the processor include instructions to vary integral gain in the feedback loop of the servo motor coupled to the binary ink developer roller to reduce the standard deviation.

12. The medium of claim 7, wherein the instructions executable by the processor include instructions to vary proportional gain and integral gain in the feedback loop of the servo motor coupled to the binary ink developer roller to reduce the standard deviation.

13. A system for reducing print quality defects, the system comprising a processing resource in communication with a memory resource, wherein the memory resource includes a set of instructions and wherein the processing resource is designed to carry out the set of instructions to:
   print a pattern with an offset printing device having a plurality of binary ink developer rollers and a plurality of cleaning rollers;
   determine a standard deviation for a hue shift of the printed pattern;
   determine a standard deviation for a density shift of the printed pattern;
   vary gain in a feedback loop of a servo motor coupled to a first of the plurality of binary ink developer rollers to reduce the standard deviation for the hue shift by reducing separation between the first binary ink developer roller of the plurality binary ink developer rollers and a first cleaning roller of the plurality of cleaning rollers; and
   vary gain in a feedback loop of a servo motor coupled to a second of the plurality of binary ink developer rollers to reduce the standard deviation for the density shift.

14. The system of claim 13, wherein the processing resource is designed to vary a variable of integration in the feedback loop of the servo motor coupled to the first of the plurality of binary ink developer rollers to reduce the standard deviation for the hue shift.

15. The system of claim 13, wherein the processing resource is designed to vary a variable of integration in a feedback loop of a servo motor coupled to the second of the plurality of binary ink developer rollers to reduce the standard deviation for the density shift.

* * * * *